United States Patent [19]

Ratchford

[11] Patent Number: 4,470,116

[45] Date of Patent: Sep. 4, 1984

[54] DIGITAL FLIGHT DATA RECORDING SYSTEM

[75] Inventor: Michael Ratchford, East Granby, Conn.

[73] Assignee: United Technologies Corporation, Hartford, Conn.

[21] Appl. No.: 404,063

[22] Filed: Aug. 2, 1982

[51] Int. Cl.[3] .................... G11B 5/00

[52] U.S. Cl. .................... 364/424; 360/5; 369/21

[58] Field of Search .................... 364/424, 433, 900; 360/5, 31; 369/21

[56] References Cited

U.S. PATENT DOCUMENTS

| | | | |
|---|---|---|---|
| 3,327,067 | 6/1967 | Boniface | 360/5 |
| 3,461,429 | 8/1969 | Gray | 360/5 |
| 3,581,014 | 8/1971 | Vogel | 369/21 |
| 3,783,197 | 1/1974 | Towner | 360/5 |
| 4,409,670 | 10/1983 | Herndon et al. | 360/5 |

*Primary Examiner*—Gary Chin

*Attorney, Agent, or Firm*—Dominic J. Chiantera

[57] ABSTRACT

A flight data recording system includes a digital flight data recorder (DFDR) and a digital flight data acquisition unit (DFDAU) having a signal processor and non-volatile memory for storing signals representative of a deterministic flight mode algorithm which defines a generic aircraft flight profile by preselected modes, each mode defining a flight profile operating station, the deterministic flight mode algorithm defining the nominal values of some number of sensed flight data parameters in terms of the sensed values of some number of the remaining other sensed flight parameters. At each such station, the signal processor comparing the actual sensed mandatory flight parameter value with the corresponding determined value to establish sensor accuracy.

6 Claims, 6 Drawing Figures

DIGITAL FLIGHT DATA RECORDING SYSTEM

DESCRIPTION

TECHNICAL FIELD

This invention relates to aircraft digital flight data recording (DFDR) systems, and more particularly to self-testing of DFDR systems during flight operation.

BACKGROUND ART

In the United States commercial aircraft having greater than a 7500 pound payload and thirty passenger seat capacity are required by Federal Aviation Agency (FAA) regulations (Title 14 CFR "Aeronautics and Space", parts 0–199) to provide historical recording of certain mandatory flight parameters. The mandated flight parameters, which must be continuously recorded during the operational flight profile of the aircraft, include a minimum number of functional parameters considered essential for reconstructing the aircraft flight profile in post accident investigation proceedings. Present recording requirements specify a minimum 25 hour interval.

The data recording is made on a Flight Data Recorder (FDR) designed to withstand a crash environment. These FDRs are either of two types: (i) electromechanical or (ii) solid-state memory. At present the electromechanical recorders represent the majority used on both civil and military aircraft. They include both analog signal, metal foil and digital signal, magnetic tape. The digital signal recorders (solid-state or electromechanical) represent the contemporary standard for all new aircraft. This results from the development of high accuracy, fast response engine digital signal sensors, which have stimulated requirements for improved flight data monitoring systems. The digital recording system signal formats are defined by ARINC 717, which replaces the ARINC 573 definitions of analog signal formats for implementing the FAA performance specifications for historical recording of the flight parameters.

The recording system input data is, as is the remaining nonrecorded flight data, sensed within the various operating systems of the aircraft, acquired and conditioned in a digital flight data acquisition unit (DFDAU), and presented to the digital flight data recorder (DFDR) for preserved recording. The DFDAU is the collecting source for the flight data recorder as well as the other utilization equipment (e.g. airborne integrated data system, AIDS). The DFDR cannot function without the DFDAU. The DFDAU, in turn, receives the flight data from the multifarious sensor signal groups of the aircraft, including the Air Data Computer, Flight Management System, etc. As a consequence overall recording system integrity is dependent on the data sensors and sensor signal conditioning circuitry, the data acquisition unit, the flight data recorder, and the aircraft interconnecting wiring.

The extended nature of the components involved make reliability of the system a major concern. Prior art recording systems include built-in test equipment (BITE) for the DFDAU and DFDR, but not the sensors. The sensors are not subject to BITE testing due to practical constraints, e.g. nature of the sensor and/or the BITE requirements, or the existence of different manufacturer and suppliers of the equipment; manfacturers of the data acquisition and recorder hardware are not those which provide the sensors. As a consequence the sensor interface is untested during flight.

To assure recording system integrity the airlines are required by FAA (or other regulatory agency) to periodically certify operation of the flight data recording system on each aircraft. This requires that the DFDR be removed from the aircraft and tested on a scheduled basis; typically every 2,000 hours. The data stored in the DFDR is read from the recorder and transscribed to determine that all elements of the system are functional. The DFDR must then be routed through the airline maintenance cycle prior to being returned to service. This not only represents high cost, but the method of test (off-line) still allows the risk of overlooking overall system integrity, e.g. underestimating the significance or lack of significance of any given units of recorded data.

DISCLOSURE OF INVENTION

The object of the present invention is to provide operational self-testing of flight data recording systems to establish, quantitatively, the system integrity in recording mandatory flight data parameters.

According to the present invention, a flight data recording system includes a digital flight data recorder (DFDR) and a digital flight data acquisition unit (DFDAU) having a signal processor and nonvolatile memory for storing signals representative of a deterministic flight mode algorithm which defines a generic aircraft flight profile by preselected modes, each mode defining a flight profile operating station, the deterministic flight mode algorithm defining the nominal values of some number of sensed flight data parameters in terms of the sensed values of some number of the remaining other sensed flight parameters. At each such station, the signal processor comparing the actual sensed mandatory flight parameter value with the corresponding determined value to establish sensor accuracy.

The flight data recording system of the present invention provides for use of a deterministic flight mode algorithm to perform the integrity check on the mandatory recorded parameters including measuring the accuracy of the sensed parameters to be recorded, and the actuality of the flight data recorder in recording these sensed parameters, e.g. corroborative determination of the actual recording of the selected aircraft flight parameters. The recording system flight mode algorithm provides ARINC 717 systems operational testing. As such, the need for periodic transcription of the DFDR data to verify recorded sensed data accuracy is dramatically reduced.

The flight mode algorithm is based on simple truths regarding the performance, or state conditions of the various aircraft elements, e.g. the engine thrust reversers are not deployed in the takeoff mode. Each mandatory recorded parameter is checked for accuracy at some known flight condition, and the system verifies the transition of the parameter between states, verifying that the sensed signal is not the result of a sensor in a failed, fixed position. The intent of the integrity check is to automate a procedure which is now performed manually in the maintenance cycle of the prior art flight data recording systems.

These and other objects, features, and advantages of the present invention will become more apparent in light of the following detailed description of a best mode embodiment thereof, as illustrated in the accompanying drawing.

BRIEF DESCRIPTION OF DRAWING(S)

BEST MODE FOR CARRYING OUT THE INVENTION

Figure 2:
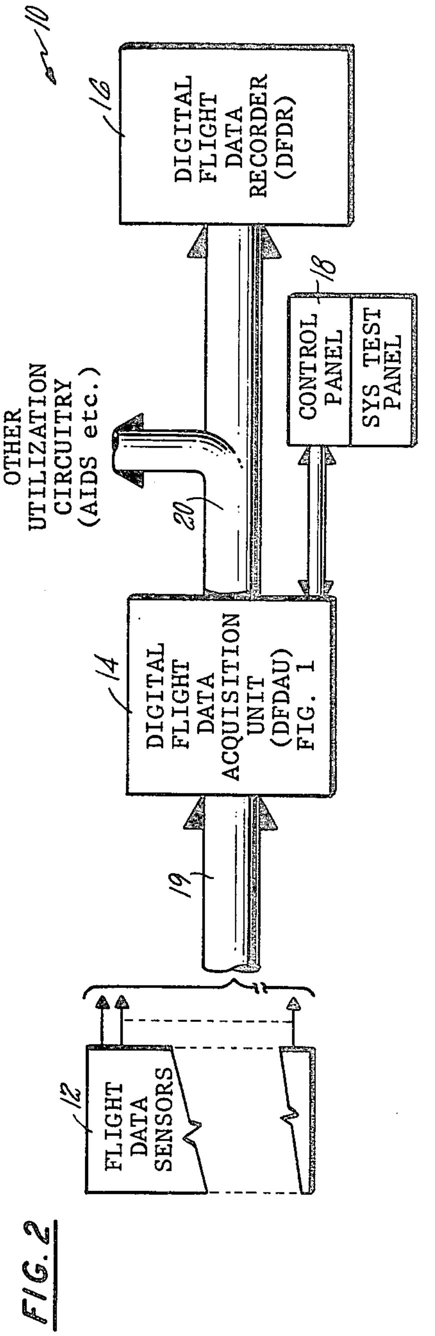
FIG. 2 is a simplified overview illustration of the system embodiment of FIG. 1.

FIG. 2 is a simplified overview, system block diagram illustration of a digital flight data recording system 10. The system includes flight parameter sensors or signal sources 12, a digital flight data acquisition unit (DFDAU) 14, a digital flight data recorder (DFDR) 16 and a combination control system test panel 18. The sensors 12 include various signal types and sources; discrete, analog, and digital signal input(s) provided through lines 19 to the DFDAU. The DFDAU output to the DFDR on lines 20 (and to other aircraft utilization circuitry) is the conditioned data, formatted in specified ARINC protocol including a 64 words-per-second (WPS) Harvard Biphase and, optionally, a 128 WPS bipolar return-to-zero (BRZ).

Figure 3:
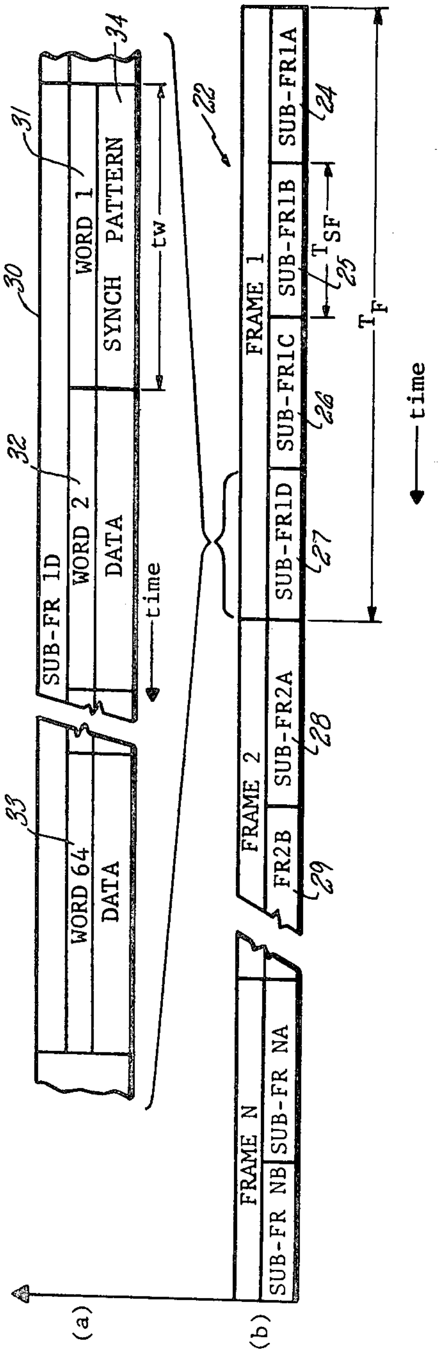
FIG. 3 is an illustration of an exemplary sensed data format used in the description of the system embodiment of FIG. 1.

FIG. 3, illustration (b) shows a typical DFDAU output data signal format 22 with N serial data frames (FRAME 1 through FRAME N, numbered with reference to time of recording in the DFDR). As illustrated, each data frame is divided into quarter subframes (e.g. Sub-Fr 1A through Sub-Fr 1D, 24–27 for Frame 1, Sub-Fr 2A, Sub-Fr 2B, 28, 29 for partial Frame 2 etc.). FIG. 3, illustration (a) shows the 64 WPS Harvard Biphase subframe format 30. A synchronization word 31 is the first word in each subframe followed by 63 data words (e.g. words 32, 33). The synch word includes a twelve bit "synch pattern" 34 which uniquely identifies the subframe within the parent frame, otherwise the subframe format for each frame is identical. Although the synch word bit pattern 34 differs with each succeeding subframe in a common frame (as specified by the ARINC 717) the patterns are repetitive in each subsequent frame. The subframe time is $T_{SF}$ (one second for 64 WPS) and the word time is $t_W$; the total frame time interval is $T_F$.

Figure 1:
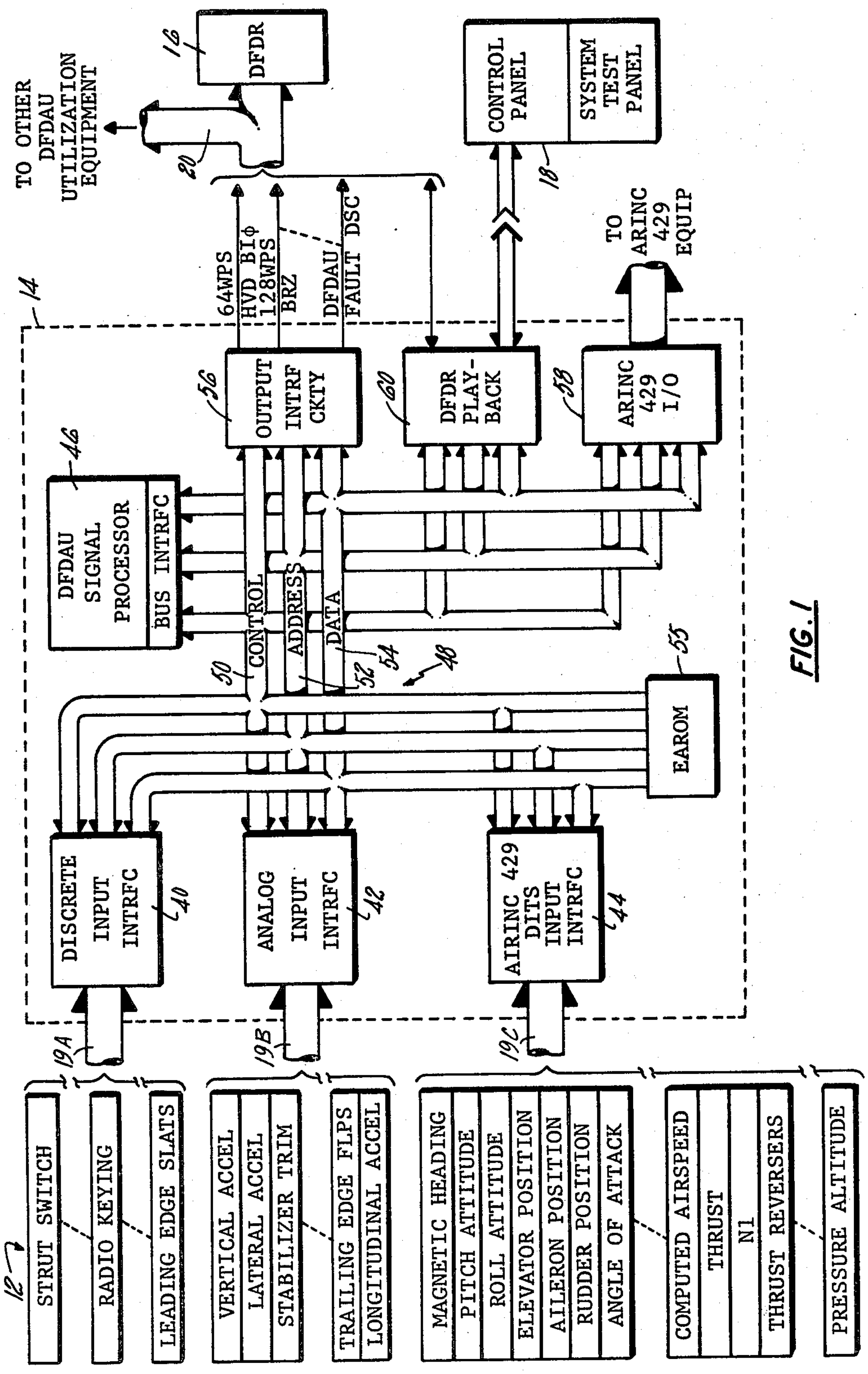
FIG. 1 is a system block diagram of the flight data recording system of the present invention.

Referring to FIG. 1, in a system block diagram illustration of the present flight data recording system the DFDAU 14 receives the sensed flight data signals from different sensor groups or data sources (e.g. air data computer, flight management system, etc.) 12. FIG. 1 is only a partial listing of the various flight data sensed parameters; specifically those defined by ARINC 717 as mandatory recording flight data which are grouped according to signal type for a given (e.g. 767) aircraft. These include the following.

Discrete signal inputs, including:
(1) strut switch on/off,
(2) radio keying on/off, and
(3) leading edge slats extend/retract.

Analog sense signals, including:
(4) vertical acceleration,
(5) lateral acceleration,
(6) stabilizer trim,
(7) trailing edge flaps position, and
(8) longitudinal acceleration.

Digital signal inputs (provided in the ARINC 429 BRZ format), including:
(9) magnetic heading,
(10) pitch attitude,
(11) roll attitude,
(12) elevator position,
(13) aileron position,
(14) rudder position,
(15) angle of attack,
(16) computed airspeed,
(17) engine(s) thrust,
(18) N1 (all engines),
(19) thrust reversers, and
(20) pressure altitude.

The sensed data is presented to one of three different signal type input interfaces within the DFDAU; a discrete input interface 40, an analog input interface 42, or an ARINC 429 digital information transfer system (DITS) input interface 44, depending on signal type. Each interface converts the data into a digital format compatible with the DFDAU signal processor 46, which is a type known in the art and which, in FIG. 1, includes the CPU, RAM and ROM. The processor accesses the interface data via system bus 48 (control bus 50, address bus 52 and data bus 54) using software techniques and methods known to those skilled in the software programming art. The formatted information from each interface is stored in a direct memory access (DMA) in the interface for later retrieval by the processor. A separate nonvolatile memory 55, such as an electrically alterable read only memory (EAROM) is included to store the system self-test results, as described in detail hereinafter.

The retrieved DMA data from each interface is provided at the DFDAU output interface circuitry 56 via the system address and data buses 52, 54. The output interface 52, together with the special list ARINC 429 input output (I/O) interface 58, convert the DFDAU digital format to the particular specified AIRINC output format, including the 64 WPS Harvard Biphase and the 128 WPS BRZ. As described hereinafter the output interface also provides a DFDAU fault discrete signal notifying the other user equipment (including the DFDR for historical flight data records) of its own health status; the health check provided by a BITE routine performed by the processor 46 periodically during DFDAU operation.

The DFDAU signal outputs are presented through lines 20 to the DFDR 16 and to the other utilization equipment. The input to the DFDR is the ARINC 717 64 WPS Harvard Biphase. A DFDR playback circuit 60 provides, under control of the DFDAU signal processor 46, periodic interrogation of the DFDR. As explained hereinafter the playback circuit retrieves and examines a portion of the historical data already stored in the DFDR for data content. This allows determination of the actual, accurate operation of the recorder function.

The DFDAU signal processor 46 controls the DFDR playback test routine and the DFDAU BITE routine. As such, the hardware and interconnecting wiring for each may be periodically tested and their operating status verified during system operation. It does not provide an indication of the operation of the individual flight data sensors nor quantitative determination of the accuracy of the sensor signal. This results from the inability to provide test hardware and interconnections between a central supervisory BITE system and each of the sensors. While some parent sources of flight data may include internal sensor BITE, (a) this covers only sensor hardware not signal accuracy, and (b) the DFDR itself has no way of knowing when and if such BITE has been performed on a mandatory flight parameter and if so, the result. The reasons for lack of a coherent, central system sensor BITE in the prior art recording systems is the fact that the sensors are supplied by different manufacturers, are physically located in different areas and sub-systems of the aircraft, and are not accessible to any type of central supervisory type test routines as would be necessary to coordinate testing and report the results to a single source, e.g. the DFDR.

In the present flight data recording system the DFDAU self-test includes testing of the sensor(s) operation and sensed signal accuracy. This is provided by use of a deterministic model of a generic flight profile, or flight schedule in which all of the mandatory flight parameters appear as variables at different "stations" of the schedule. Each such station (or operating state of the aircraft) is defined by a particular mode of the model. In each mode one or more of the mandatory flight parameters has a nominal value which may be determined by the relationship of the mandatory parameter to one or more of the other flight parameters relevant to the particular mode defined station. Therefore, the mode defines the flight profile station and determines the relationship between the given mandatory parameter(s) (for that mode) and the mode's independent variables (e.g. independent with respect to the particular mode and the mandatory parameter of interest: the dependent/independent status holds only for the particular mode).

Table A of Appendix A lists the seven modes of the exemplary flight mode algorithm for the present embodiment. The algorithm is stored in the DFDAU EAROM 55. The seven modes are: INITIALIZATION (I), GROUND (G), LIFT-OFF (L), CRUISE (C), APPROACH (A), ROLLOUT (R), and END OF ROLLOUT. The existance of a mode during flight is established by an associated set of boundry conditions, the existence or presence of which is defined by the values of one or more of the sensed flight parameters, as described hereinafter. Each mode station defines a unique window (time of existence or presense) in the aircraft flight profile in which the mandatory flight parameter nominal value is determined by the model.

Figure 4:
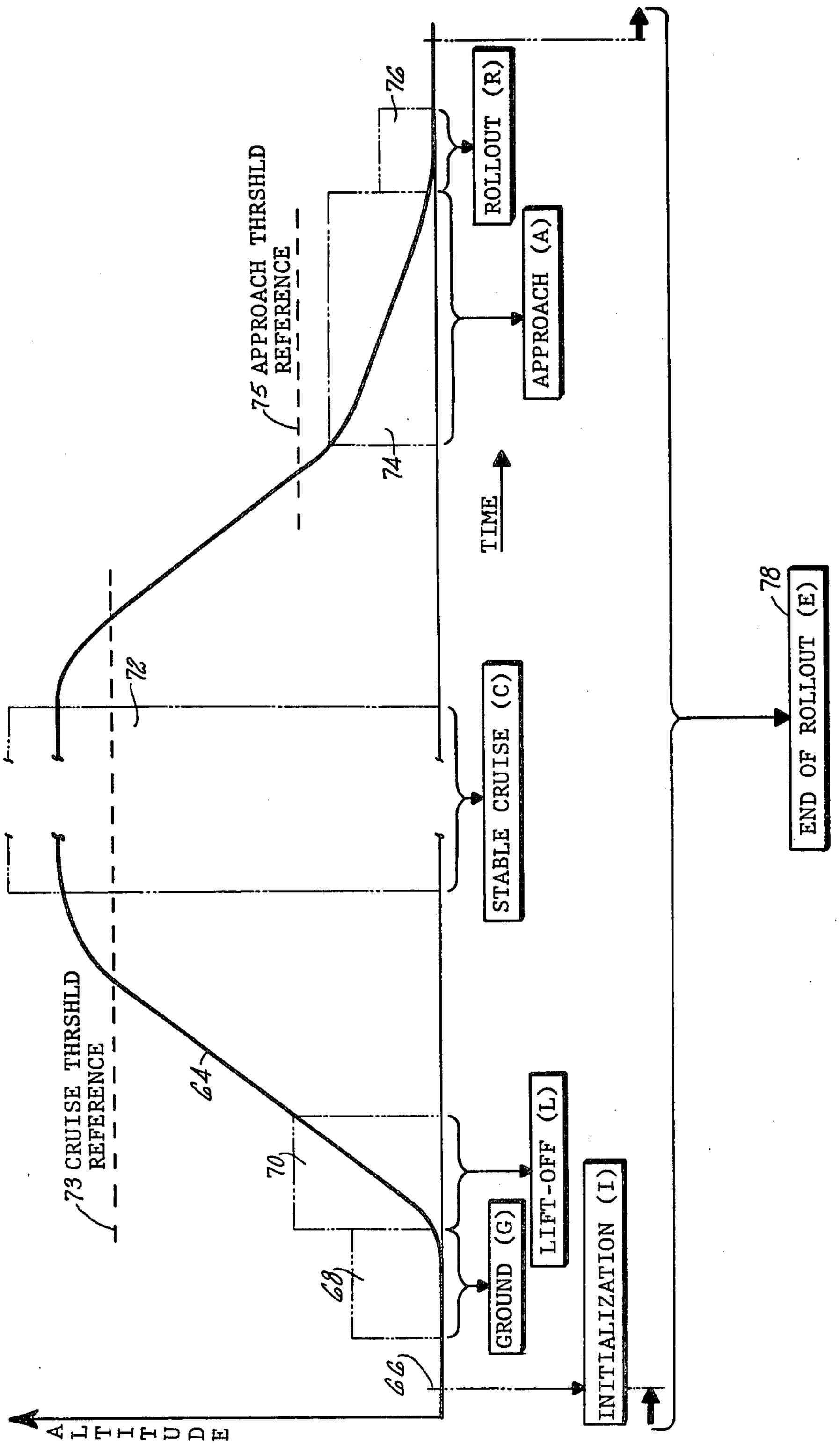
FIG. 4 is an illustration of one aspect of a generic flight mode algorithm used in the system embodiment of FIG. 1.

In FIG. 4, an illustration of the generic flight profile algorithm, the flight profile 64 plots travel of the aircraft in two-dimensional (altitude versus time) coordinates. The seven modes of the model are shown as they occur along the profile 64. A particular flight begins with the INITIALIZATION MODE 66. This mode begins with starting of the engines in preparation for takeoff. As indicated (Boundry Conditions in Table A) the I mode continues as long as the engine speed for any one of the engines is less than 55% of full speed. The GROUND MODE 68 follows, and is the flight profile interval between full engine start ($N_2$ is greater than 55% for all engines) and LIFT-OFF. The LIFT-OFF mode 70 is the first eight seconds of airborne interval, e.g. that following ground to air transition of the Strut Switch and a computed airspeed greater than 200 knots. The CRUISE MODE 72 occurs at stable altitude greater than a selected Cruise Threshold Reference 73. In Table A the threshold reference (exemplary) is 25,000 feet, with computed airspeed greater than 200 knots, strut switch in air, and a FLM Stable Cruise condition. The APPROACH MODE 74 occurs at altitudes less than a selected Approach Threshold Reference Altitude 75, with computed airspeed greater than 200 knots. It represents the time at low altitude, immediately prior to touchdown. The ROLLOUT mode 76 is the time between touchdown and slowdown of the aircraft to taxispeed; it ends with establishment of aircraft taxi. The final profile mode is END OF ROLLOUT 78, which is the time between taxispeed (completion of ROLLOUT) and engine start (INITIALIZATION) for the next flight (e.g. hours or days).

Table B (Appendix A) lists the parameter values determined in each mode of the flight mode algorithm of FIG. 4. Some of the parameters (e.g. trailing edge flaps, leading edge slats, thrust reversers, etc. . . . ) are value determined in more than one mode to ensure state transition of the sensor signal, e.g. that the associated controlled device has changed its controlled position and that the change is manifested by the particular flight data parameter. The parameter value determinations are made during the associated mode window (FIG. 4) and may occur in selected sequence or by processor interrupt during the mode interval. Interrupt processing frees the processor until the proper boundry conditions are established and the supporting flight data parameters used in calculation of the particular mandatory parameter value are available.

Figure 5A:
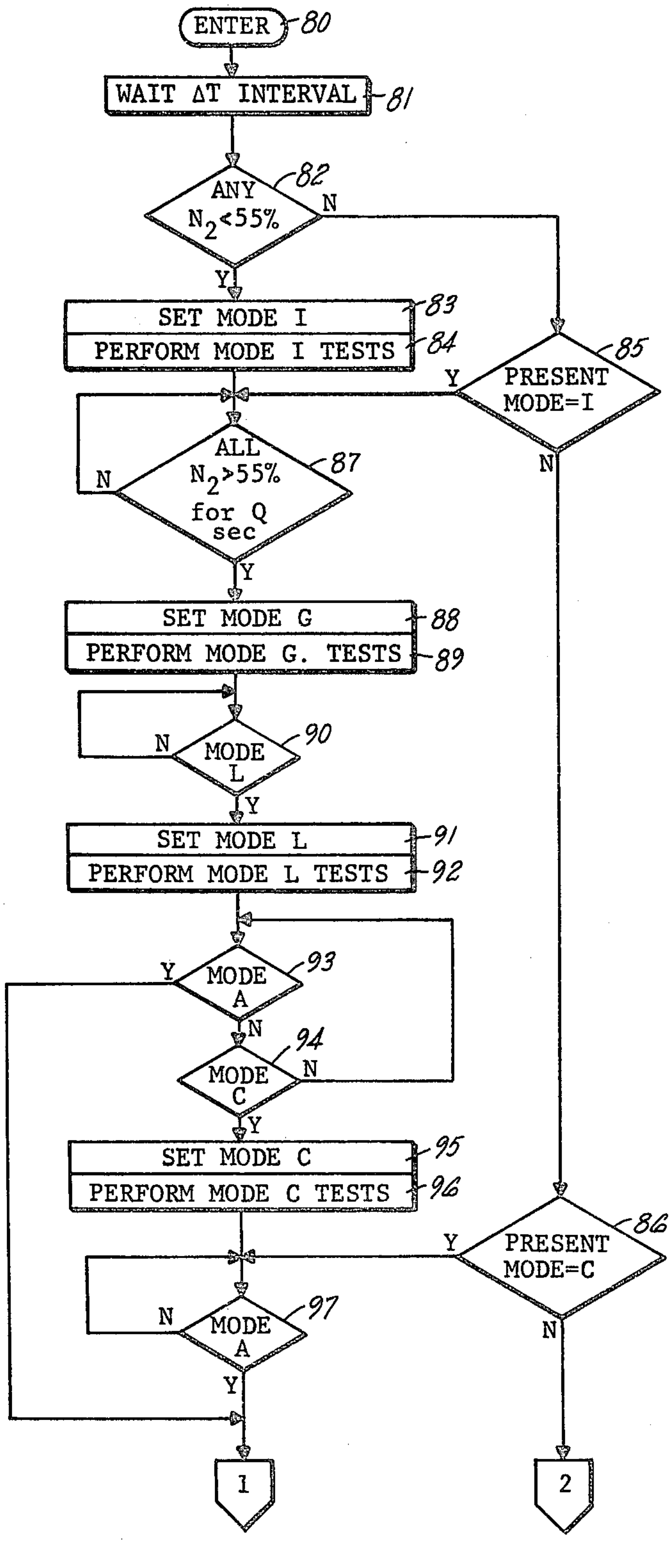
FIGS. 5A, B is a flow chart diagram illustrating the deterministic function performed by the system embodiment of FIG. 1.

Referring now to FIGS. 5A, B, which illustrates the routine performed by the DFDAU processor 46 in comparing the determined values for the mandatory parameter in each mode with the actual sensed values for the same parameter as they occur in the mode, during the flight schedule profile (illustrated in FIG. 4). The processor enters the routine at 80 and waits for a specified time interval 81 (typically four seconds) to allow establishment of steady state conditions. Decision 82 determines whether any of the aircraft engines have an $N_2$ (high pressure compressor speed) less than a selected percent of full scale. For the 767 aircraft application illustrated in this embodiment this threshold is fifty five percent; this is, however, only an exemplary value. If YES then the aircraft is assumed to be in the INITIALIZATION (I) mode (66, FIG. 4) whereby instructions 83 set the MODE I flag and instructions 84 command performance of all MODE I tests. As indicated in Table B the only flight parameter tested in MODE I is the discrete strut switch signal which reports the air/ground status of the strut switch. The Table A boundary conditions for the INITIALIZATION (I) mode require a ground indication for the switch signal with an $N_2$ less than 55% on any engine and a computed airspeed less than 100 knots.

Figure 5B:
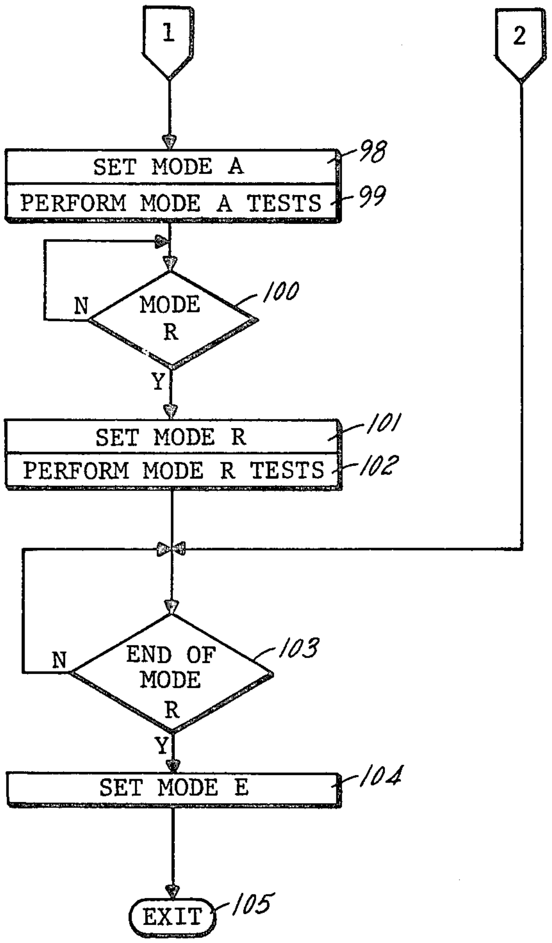

If decision 82 is NO, decision 85 determines if the aircraft is presently in a MODE I. Although $N_2 < 55\%$ is necessary to establishing MODE I it need not be a steady state condition of the mode, and MODE I may exist notwithstanding a later $N_2 < 55\%$. If decision 85 is NO decision 86 determines if there is a present CRUISE mode. This query results from the fact that the signal processor entry into the routine may be the result of a power on reset occurring during the flight schedule. If so, the queries by decisions 85, 86 allow the processor to reestablish its place in the program. If the decision 86 answer is NO the processor assumes an end of flight schedule to exist, e.g. the ROLLOUT MODE as described hereinafter with respect to FIG. 5B.

Following instructions 84 or a YES to decision 85, decision 87 determines if all engine $N_2$ values are greater than 55% for a specified (e.g. 60 second) time interval. The time interval verifies existence of a steady state high compressor engine speed as opposed to a transient condition. If NO the processor idles in a wait loop, periodically reexecuting decision 87. If YES instructions 88 set the MODE G flag and instructions 89 request performance of the MODE G tests. The MODE G (GROUND MODE) tests are extensive; eleven mandatory parameters are value determined and compared with their actual sensed value. One discrete (radio keying) three analog signals (vertical acceleration, lateral acceleration and stabilizer trim) and the remaining seven digital signals. As indicated in Table A the boundry conditions establishing the GROUND (G) mode, in addition to a steady state high compressor engine speed ($N_2$) of more than 55%, are the same as those establishing the INITIALIZATION mode, e.g. strut switch in ground and computed airspeed less than 100 knots. As indicated in FIG. 4 the window associated with the MODE G (68, FIG. 4) exists up until the time of lift-off. It is a critical interval for mandatory flight data since it is the preflight condition health check for the aircraft. The integrity check performed by the flight mode algorithm on these mandatory flight parameters in this critical period is itself critical to establishing the validity of the apparent values of the parameters. In effect testifying as to the credibility of the sensed parameter values, which is invaluable in a post accident reconstruction situation.

As previously indicated each test may be performed in set sequence or by interrupt; the order of performing is immaterial. Assuming a sequence, the comparison tests are briefly:

Vertical acceleration—should be at an average acceleration value over a set interval of time (e.g. 1.0±0.2 g over an eight second interval);

lateral acceleration—similarly an average value, e.g. 0.0±0.1 g over an eight second interval;

magnetic heading—should change more than 30 degrees;

pitch attitude—at 0±2° if airspeed is greater than or equal to 100 knots;

roll attitude—at 0±2° for same greater than 100 knot airspeed condition;

stabilizer trim—should be 339°-360° or 0°-12° for airspeed greater than or equal to 100 knots;

elevator position—both elevators exceed the range of travel from 10° down to 20° up;

aileron position—each exceeds the range 5° down to 15° up;

rudder position—rudder exceeds a ±20° range;

angle of attack—for an airspeed of 100±5 knots the angle of attack is −10.5 ±1.5°; and radio keying—each radio is keyed at least one time.

In comparing the actual sensed parameter values with the algorithm determined values, if the two agree the processor takes no further action. If the actual value differs from the model then the processor records the event by setting a flag, e.g. "an integrity check fail flag" associated with the particular parameter, in the DFDAU nonvolatile memory (55, FIG. 1). Each mandatory parameter has its own fail flag. The fail flag, once set, remain set until a subsequent good test result occurs in the same mode on a subsequent flight. Optionally, the flag may not be reset and instead a second flag set upon a second failure to achieve nominal value in a subsequent test. The setting of a double fail flag provides further assurance of the failed nature of the parameter. On the other hand the allowance for reset of a prior failed condition in response to a later pass condition is permitting a "benefit of the doubt" for the parameter. In addition to individual parameter fail flags a preferred embodiment also includes use of a master flag which is set at a fail state in the event of any one parameter failure. The master flag provides an overview indication of a fail condition; the exact parameter failure is then determined based on a routine interrogation of the nonvolatile memory in a post flight ground maintenance procedure. This occurs through the control and system test panel 18 (FIG. 1).

In all instances the purpose of the integrity check is to provide an indication of the accuracy (fidelity of the sensed actual data). As such, it is a value indication of the data. Its utility lies in its ability to "testify" as to the accuracy of the data recorded in the DFDR. There is no interruption of the recording process in response to existence of a faulted or out of tolerance sensed parameter value. The function of the integrity test in the present recording system is to enhance credibility of the recorded data when the enhancement is warranted, so as to allow greater reliance on the apparent condition of the aircraft as evidenced by the recorded parameter.

Referring again to FIG. 5, following completion of the MODE G tests decision 90 determines existence of a LIFT-OFF mode. As defined in Table A LIFT-OFF occurs on change in state of the strut switch to the air position together with $N_2$ engine speed greater than 55%, computed airspeed greater than 200 knots, and an antecedent GROUND mode. If the LIFT-OFF mode has not been achieved the processor idles in a wait mode, periodically rechecking. If YES, instruction 91, 92 set MODE L and perform the comparison tests on the parameters listed in Table B.

The MODE L tests are as follows:

Computed airspeed—should be greater than 130 knots;

pitch attitude—should be greater than 10°;

thrust—all engine pressure ratio (EPR) values shall be above 1.40;

$N_1$ (engine low pressure compressor spring)—all $N_1$ value shall be greater than 100%;

leading edge slats—all leading edge slats are partially extended (evidenced by sensed position discrete signals);

thrust reversers—all reverser signal discretes are in a "false" state (discrete one).

Following termination of MODE L decision 93 determines the existence of a present APPROACH mode. As indicated in Table A the APPROACH mode may be preceded by either the CRUISE or LIFT-OFF modes. Normally, as shown in FIG. 4, the CRUISE mode precedes APPROACH. However, in an abort situation APPROACH may follow LIFT-OFF if the CRUISE condition is not achieved. As shown in Table A in order to establish APPROACH the aircraft must at least exceed the approach threshold reference altitude (e.g. 8,000 ft) and then drop below (i.e. greater than—less than). If the answer to decision 93 is NO decision 94 determines existence of a present CRUISE mode. If NO then the processor idles in a wait loop around decision 93. If YES instructions 95, 96 set the mode C status and perform the mode C tests defined by Table B. These include the following.

Pressure altitude—equals N×1000±400 feet where N is any number 25 through 45 inclusive;

elevator position—(second test of the elevators) in cruise the elevators should be at 0±2°;

aileron position—(second test) in cruise all ailerons are at 0±2°;

rudder position—in cruise the change in rudder position averaged over 8 seconds is 0±2°;

trailing edge flaps—the flaps synchro signal indication shall be 315±3°;

leading edge slats—logic indicating all leading edge slats are not in position and the leading edge slats are not fully extended and the leading edge slats are not partially extended and the leading edge slats disagree/in transit switch indicates a false status (anded state indication);

longitudinal acceleration—the average change in acceleration over 8 seconds is 0.0±0.1 g.

As indicated in Table A the boundary conditions for CRUISE mode include an antecedent flight log monitor (FLM) stable cruise condition. This is a separately defined sub-set of boundary condition parameters which must be established for a defined steady state interval. These include, for a pressure altitude greater than 25,000 feet and an exemplary eighty second interval:

(a) a change in pressure altitude of less than ±100 ft;

(b) a MN=0.7±0.005;

(c) a change in EPR for all engines of less than ±0.001;

(d) a change in vertical acceleration of less than ±0.1 g; and (e) a change in total air temperature of less than ±1.0° C.

Following termination of a present CRUISE mode or a YES response to decision 86 (discussed hereinbefore) decision 97 determines if there is a present approach mode. As previously indicated (flight mode algorithm profile of FIG. 4) the APPROACH mode 74 occurs at altitudes less than that defined by the approach threshold reference altitutde. For the illustrative 767 configuration this is 8,000 feet (boundary conditions Table A) with a computed airspeed greater than 200 knots. If the answer is NO the processor again idles in a wait loop, if YES instructions 98, 99 set the MODE A and perform the MODE A tests. There are only two tested parameters in mode A. These include the following.

trailing edge flaps—if the leading edge slats are fully extended and the trailing edge flaps synchro signals do not change by ±5° for an 8 second interval, then each flap synchro signal is 180±5° or 225±5°;

leading edge slats—if the leading edge slats are fully extended then the leading edge slats are not partially extended.

The remaining mandatory parameter is tested in the ROLLOUT mode, which is the interval between touchdown and achievement of aircraft taxispeed. Decision 100 determines the existence of MODE R; if NO the processor idles until a YES response at which time instructions 101, 102 set MODE R and perform the MODE R tests. For the 767 aircraft this includes the single determination and comparison of the thrust reversers signal values. Following completion of instructions 102 or a NO to decision 86 (FIG. 5A) decision 103 determines if MODE R has terminated; if NO the processor waits and on termination instructions 104 set the end of ROLLOUT mode (E) and exit the routine at 105.

The flow chart diagram of FIG. 5A, B is exemplary. It may be altered to suit particular custom features or alternative test sequencing. Similarly the Table B mandatory parameters and parameter values are subject to change based on the particular aircraft. However, the flight mode algorithm illustrated in FIG. 4 establishes the modes occurring and their times of occurrence over the flight profile. This defines the intervals of the aircrafts flight during which the values of the mandatory parameters are to be defined and compared. To the extent that parameters are added or eliminated, or values changed, the fundmental approach remains the same, i.e. determining the parameter nominal value based on present aircraft flight schedule position as evidenced by actual sensed flight parameter values. Furthermore, to ensure availability of the antecedent sensed data necessary to determination of the mandatory flight parameters optimum values the model algorithm relies only on the use of mandatory parameters. In other words those known to exist on each aircraft regardless of manufacture.

As described hereinbefore the failure of a mandatory parameter sensed value to agree with the determined value results in setting of a fail flag for that parameter in the DFDAU memory 55. All failure flags are set, or reset, based on tests which were able to be completed. If during the associated modes some tests were not performed due to abnormal condition (such as an inflight power-on reset) the test results are discarded, e.g. neither pass nor fail. Also, as previously indicated, several of the integrity tests are based on combinations of individual tests performed on the same parameter in various modes throughout the flight. The processor shall only store pass/fail information for those tests in which it has all the necessary information from the particular parameter tests performed in the various modes; a missing mode test will now allow a pass or fail determination.

Ground access to the contents of the EAROM memory are provided through a system test panel associated with the control panel 18. The access occurs during normal ground maintenance routines and is initiated by known accessing (interrogation) techniques which provide for polling a dedicated discrete input of the DFDAU processor. The processor shall provide in response to the polling the initialization of the EAROM read content and display the status of all of the integrity checks on the system test. In this manner the results of the tests may be read out and logged together with the tape(s) or data readout of the DFDR as provided through the DFDR playback circuitry 60. In this manner the recording (tape or data readout) is accompanied by the integrity test report card.

The system testing of the DFDR operation is provided through the DFDR playback circuitry (60, FIG. 1) under processor control. The test involves examination of the actual data recorded in the DFDR, which is read out of the recorder through lines 20 (FIG. 1) back to the DFDAU playback circuit. In the case of an electromechanical tape DFDR the recorded information is read by a separate read head downstream of the record head, in a solid-state recorder a read data subroutine provides the data output without altering the recorded contents of the solid-state device memory.

In each instance the test routine determines actuality and fidelity of the recorded mandatory parameter by examining the synch words in each quarter subframe.

As described hereinbefore with respect to FIG. 3(*a*), (*b*) the synch words (e.g. 31) which occur as the first word in each subframe (24–29) each define a specific "synch pattern" (34) unique to a particular subframe in each parent frame. The playback circuitry 60, using known techniques and under control of the processor, examines the synch patterns for (a) their presence, and (b) their accuracy. In this manner it provides a quantitative test of recorder performance which, coupled with the described sensor integrity test, provides an overall system quantitative test.

Although the present invention has been shown and described with respect to a best mode embodiment thereof, it should be understood by those skilled in the art that the foregoing and various other changes, omissions and additions in the form and detail thereof may be made therein without departing from the spirit and scope of this invention.

TABLE B-continued

| APPENDIX A | |
|---|---|
| MODE | TESTED FLIGHT PARAMETER |
| | LEADING EDGE SLATS |
| ROLLOUT (R) | THRUST REVERSERS |
| END OF ROLLOUT (E) | NONE |

I claim:

1. The method of verifying the integrity of recorded flight data parameters in a flight data recording system, comprising the steps of:

sensing the actual signal values of each recorded flight data parameter;

defining a deterministic model of an aircraft generic flight schedule having specified flight mode stations sequentially arranged therealong;

TABLE A

APPENDIX A

| FLIGHT MODE | | BOUNDRY CONDITIONS | | | | | |
|---|---|---|---|---|---|---|---|
| PRESENT | PREVIOUS | ENGINE $N_2$ | STRUT SWITCH | PRESSURE ALTITUDE | COMPUTED AIRSPEED | FLM STABLE CRUISE | TIME LIMITED |
| INITIALIZATION (I) | END OF ROLLOUT | any one <55% | GROUND | — | <100 kt | — | NO |
| GROUND (G) | INITIALIZATION | all are >55% for Q sec. | GROUND | — | <100 kt | — | NO |
| LIFT-OFF (L) | GROUND | all are >55% for Q sec. | AIR | — | >200 kt | — | 8 sec |
| CRUISE (C) | LIFT-OFF | all are >55% for Q sec. | AIR | >25,000 ft | >200 kt | YES | NO |
| APPROACH (A) | CRUISE OR LIFT-OFF | all are >55% for Q sec. | AIR | >8,000 ft <8,000 ft | >200 kt | — | NO |
| ROLLOUT (R) | APPROACH | <55% | GROUND for 2 sec. | — | >32 kt <100 kt | — | NO |
| END OF ROLLOUT (E) | ROLLOUT | " | GROUND | — | <32 kt | — | NO |

TABLE B

| APPENDIX A | |
|---|---|
| MODE | TESTED FLIGHT PARAMETER |
| INITIALIZATION (I) | STRUT SWITCH |
| GROUND (G) | VERTICAL ACCELERATION |
| | LATERAL ACCELERATION |
| | MAGNETIC HEADING |
| | PITCH ATTITUDE |
| | ROLL ATTITUDE |
| | STABILIZER TRIM |
| | ELEVATOR POSITION |
| | AILERON POSITION |
| | RUDDER POSITION |
| | ANGLE OF ATTACK |
| | RADIO KEYING |
| LIFT-OFF (L) | COMPUTED AIRSPEED |
| | PITCH ATTITUDE |
| | THRUST |
| | $N_1$ |
| | LEADING EDGE SLATS |
| | THRUST REVERSERS |
| CRUISE (C) | PRESSURE ALTITUDE |
| | ELEVATOR POSITION |
| | AILERON POSITION |
| | RUDDER POSITION |
| | TRAILING EDGE FLAPS |
| | LEADING EDGE SLATS |
| | LONGITUDINAL ACCELERATION |
| APPROACH (A) | TRAILING EDGE FLAPS |

specifying optimum values for each recorded flight data parameter in at least one of said flight mode stations;

comparing in each flight mode said recorded parameter optimum value with said recorded parameter actual sensed values; and providing a parmanent record of each occurrence in which said actual sensed value differs from said optimum value.

2. A flight data system for recording the actual sensed values of flight parameters from a plurality of aircraft sensors at different flight modes of the aircraft flight profile, comprising:

data recording means, for providing nonvolatile recording of signal representations of the sensed flight parameter values; and data acquisition means, having signal processing means for providing said signal representations to said flight data recording means, and including signal memory means for storing signals;

as characterized by:

said data acquisition means further including test means for performing operational self testing of the flight data system and aircraft sensors, said test means including program means comprising a plurality of program signals stored in said signal memory means and representing a deterministic flight mode algorithm indicative of optimum values of selected flight parameters at different flight modes of the aircraft flight profile, said signal processing means comparing the sensed signal value of each selected flight parameter with the related optimum signal value of said program means for the same flight mode and providing a test failure signal to said signal memory means in response to each difference signal magnitude therebetween.

3. The system of claim 2 wherein said signal memory means stores said test failure signals in a nonvolatile medium.

4. The fight data system of claim 2, wherein said signal processing means, in response to each test failure signal, compares the failed sensed flight parameter signal value of a present flight mode with the recorded sensed signal value of the same flight parameter in a preceding flight mode to provide a sensor test failure signal in response to the presence of substantially equal values for the same sensed parameter in succeeding flight modes.

5. The flight data recording system of claim 2 wherein said program means deterministic flight mode algorithm indicates said optimum values for each selected flight parameter in each flight mode of the aircraft in dependence on the determined relationship of the selected flight parameter to other flight parameters having known values in the same flight mode.

6. The flight data system of claim 5, wherein said optimum values for each selected flight parameter are dependent on other flight parameters having known values which are independent of the related selected flight parameter in the same flight mode.

* * * * *

UNITED STATES PATENT AND TRADEMARK OFFICE
CERTIFICATE OF CORRECTION

PATENT NO. : 4,470,116

DATED : September 4, 1984

INVENTOR(S) : MICHAEL RATCHFORD

It is certified that error appears in the above-identified patent and that said Letters Patent is hereby corrected as shown below:

Column 6, Line 63: after "later" change "$N_2 < 55\%$" to --$N_2 > 55\%$--

Column 9, Line 44: after "reference" change "altitutde" to --altitude--

Column 10, Line 14: after "the" change "fundmental" to --fundamental--

Column 10, Line 39: after "will" change "now" to --not--

Signed and Sealed this

*Eighth* Day of *October 1985*

[SEAL]

*Attest:*

DONALD J. QUIGG

*Attesting Officer*

*Commissioner of Patents and Trademarks—Designate*